United States Patent
Riebe

(10) Patent No.: US 6,702,068 B1
(45) Date of Patent: Mar. 9, 2004

(54) AIRCRAFT BRAKE

(75) Inventor: Gary C. Riebe, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 1,826 days.

(21) Appl. No.: 08/351,993

(22) Filed: Dec. 8, 1994

(51) Int. Cl.$^7$ .............................................. F16D 55/36
(52) U.S. Cl. ................ 188/71.5; 188/251 A; 188/264 G
(58) Field of Search ............................ 188/1.11, 18 A, 188/71.5, 71.6, 218 XL, 251 A, 264 G; 192/113.4

(56) References Cited

U.S. PATENT DOCUMENTS

| | | | |
|---|---|---|---|
| 2,017,715 A | * 10/1935 | Goodyear et al. | 188/264 G |
| 2,964,137 A | * 12/1960 | Luedtke et al. | 188/264 G |
| 3,018,852 A | * 1/1962 | Stanton | 188/1.11 X |
| 3,138,406 A | * 6/1964 | Chamberlain | 188/18 A X |
| 3,498,418 A | 3/1970 | Dewar | 188/72 |
| 3,731,776 A | * 5/1973 | Fisher | 188/251 A X |
| 4,006,669 A | 2/1977 | Price | 93/13.1 |
| 4,503,950 A | 3/1985 | Anderson | 188/196 R |
| 4,605,440 A | * 8/1986 | Halverson et al. | 75/238 |
| 4,703,837 A | * 11/1987 | Guichard | 188/71.5 |
| 5,186,284 A | * 2/1993 | Lamela et al. | 188/1.11 X |
| 5,205,382 A | 4/1993 | Edmisten | 188/71.5 |
| 5,325,941 A | * 7/1994 | Farinacci et al. | 188/218 XL |

* cited by examiner

Primary Examiner—Jack Lavinder
(74) Attorney, Agent, or Firm—Goodrich Corporation

(57) ABSTRACT

A friction device such as an aircraft wheel and brake assembly having a wheel member journaled for rotation on a fixed member, which fixed member supports a torque tube member. A plurality of primary friction disks are carried by splines on the wheel member while a plurality of secondary friction disks are carried by splines on the torque tube member with such secondary disks interleaved with the primary friction disks for axial movement towards one end of the torque tube. An actuator, such as a plurality of pistons, is mounted on the fixed member to urge all the friction disks into frictional engagement with each other and against a stationary disk on the one end of the torque tube. A rigid disk is positioned between the actuator and the pluralities of friction disks, and acts as a pressure plate. The rigid disk may be formed of carbon or ceramic composite material.

25 Claims, 2 Drawing Sheets

AIRCRAFT BRAKE

BACKGROUND OF THE INVENTION

This invention relates to a friction device suitable for an aircraft braking system and more particularly to a new and improved pressure plate for use with a multi-disk brake stack, especially one made of ferrous or other metal, in a multiple actuator system for an aircraft wheel and brake assembly. During braking of an aircraft, the axially aligned, alternately splined stator disks and rotor disks of the brake stack are brought into axial sliding engagement with each other, generating considerable heat energy that is dissipated over time. The brake stack is a heat sink which absorbs heat generated during braking action. However, in an aborted or rejected take-off there is a much greater problem of generated heat due to the facts that (a) speed may be higher than normal speed at which the brakes are applied after landing, (b) weight is higher due to fuel provided for consumption during normal flight and (c) only limited or inadequate stopping distance may be available. One proposed solution has been to provide for extended actuating piston travel in such an emergency to compensate for the considerable brake lining wear and degradation and corresponding brake failures, hoping to provide maximum stopping effort. Another alternative is to increase the size of the brake stack and its associated mass, which would also increase the weight of the braking system by a significant amount which is undesirable in meeting overall performance requirements.

The present invention approaches this problem by the provision and use of an annular rigid disk in front of the friction elements of the brake stack which in certain preferred embodiments also includes a steel pressure plate, thus locating this rigid disk between the pressure plate and the plurality of circumferentially spaced actuating pistons which are mounted on the stationary brake carrier that also supports the torque tube.

In any braking action in which the steel pressure plate temperature exceeds 800 degrees Fahrenheit, the steel pressure plate may begin to yield and bend or otherwise deform at the applied clamp force. In an aborted or rejected take-off condition, the brake stack and its adjacent components may reach an elevated temperature of approximately 2000° Fahrenheit, which causes the friction materials, which are commonly made from copper based or iron based materials, to melt and the steel portions to loose a significant amount of their strength, resulting in a significant loss in the axial dimension and mass of the brake stack as well as distortion in the components of the brake stack, particularly at the pressure application points of the actuator pistons. This type of action also flexes the rotating disks of the brake stack causing structural deterioration as well as reducing the clamp load efficiency by loss of uniform load application which reduces the torque output capability of the brake. The present invention overcomes these deficiencies by reducing the piston stroke consumption and increasing the clamp load efficiency by utilizing the previously mentioned rigid disk, which rigid disk provides stiffness to the brake stack at elevated temperatures and thus also maintains a more uniform clamp load distribution across the full face of the brake stack and enhances the structural integrity of the brake stack. By utilizing the structural combination of the invention, there is a reduction of piston stroke consumption during high energy braking, thereby reducing the reserve stroke required to accomodate rejected take-off. For the purpose of this specification including the appended claims, high energy is defined as a braking event in which the temperature of pressure plate exceeds 800 degrees Fahrenheit. The assurance of actuator input pressure being better distributed throughout the brake stack by use of the new pressure plate design permits reduction of clamp force and thus piston area for a given frictional material which in turn reduces brake mass and weight, or in the alternative it can allow for the use of a lower coefficient of friction material that otherwise could not be used. The resulting reduced piston to pressure plate contact area reduces undesired conductive heat transfer into the hydraulic system.

SUMMARY OF THE INVENTION

According to an aspect of the invention there is provided a friction device comprising: a brake stack having a front axial end adapted to be positioned adjacent to an actuator and a rear axial end adapted to be positioned adjacent to a reaction member, the brake stack including alternating rotor and stator disks mountable with respect to an inner torque tube and an outer wheel for relative rotatable and axial movement, each rotor disk adapted to be coupled to said wheel for rotation therewith and each stator disk adapted to be coupled to said torque tube against rotation relative to said torque tube; the majority of the disks of the brake stack being formed of a material that will deform or flow during an anticipated high energy braking action; the front axial end of the brake stack comprising a first rigid disk; the first rigid disk capable of evenly distributing the clamping load across the faces of said brake stack when said actuator is operated to effect said braking action. The friction device may further include a second rigid disk or rigid reaction disk at the rear axial end of the brake stack. The friction device may further include an actuator adapted to be operatively connected against rotation during a braking action to a fixed mounting means including an axle; a wheel member adapted to be operatively connected to said axle and rotatable with respect thereto; said wheel member having a plurality of axially extending splines; a torque tube member operatively connected to said actuator; said torque tube member having a radially outwardly extending annular end portion defining a torque plate; said torque tube having a plurality of axially extending splines; each rotor disk being coupled to said wheel for rotation therewith and each stator disk being coupled through said torque tube to said wheel support against rotation; the majority of said disks of said brake stack being formed of ferrous material; wherein an annular disk of friction braking material is secured to one face on said pressure plate that is furthermost from said front axial end; and said first rigid disk is formed of a material capable of maintaining a clamp load during braking application during a high energy stop that is more uniform than the clamp load that results when using only a pressure plate of steel. One or both of the first and second rigid disks may be formed of carbon or ceramic material. A particularly preferred material for the first and second rigid disks is carbon fiber reinforced carbon matrix composite.

DETAILED DESCRIPTION

Figure 1:
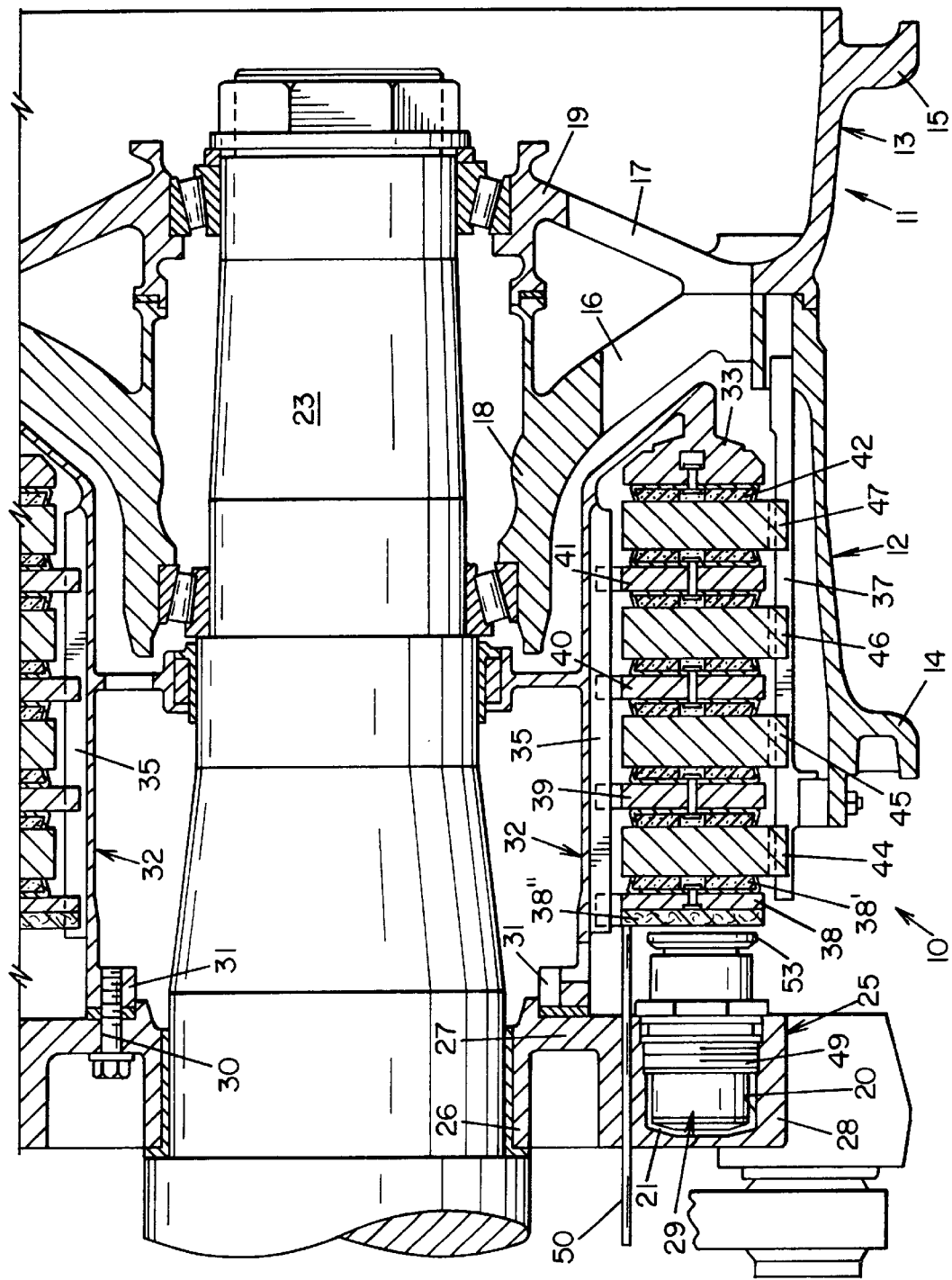
FIG. 1 is a schematic cross-sectional view of an aircraft wheel and brake assembly showing a piston housing with an actuating cylinder, pressure plate, torque tube and brake stack.

Referring to the drawings, wherein like reference numerals designate like or corresponding parts throughout the several views, there is shown in FIG. 1 a preferred embodiment of a friction device according to the invention in the form of an aircraft brake mechanism 10 for use with a cylindrical wheel 11 having matching annular wheel sections 12 and 13. Each of the respective outer wheel sections 12 and 13 has an associated tire flange or rim member 14 and 15, web member 16 and 17, and hub member 18 and 19. The wheel sections 12 and 13 are fastened together by suitable bolts disposed in aligned bores within web members 16 and 17 to form an integral unit herewith. The hub members 18 and 19 are adapted to be supported for rotation on suitable bearings, which are mounted on a nonrotatable axle 23 having a central axis.

Carrier or piston housing 25 is adapted to be mounted on a fixed mounting means including an axle 23 against rotation relative to wheel 11 during a braking event. Carrier 25 has an inner hub or rim portion 26, a radially extending flange or flange portion 27 and a plurality of circumferential spaced cylinders or cylinder housings 28. Flange 27 of the carrier 25 has a plurality of circumferentially spaced bores 30 for securing such flange to an annular hub 31 of a cylindrical torque tube 32. Torque tube 32 has at its rear axial end an annular and radially outwardly extending torque plate or reaction plate 33. The reaction plate 33 may be formed integrally with the torque tube 32 or may be made as a separate annular piece and suitably connected to the torque tube 32.

Torque tube 32, which is stationary relative to rotatably mounted wheel 11 during a braking action, has a plurality of circumferentially spaced splines 35, which are axially extending. Rotatable wheel section 12, has a plurality of circumferentially spaced axially extending ribs 37 adjacent to its inner peripheral surface, which are secured thereto or integrally formed therewith to provide drive ribs for the brake assembly.

Figure 2:
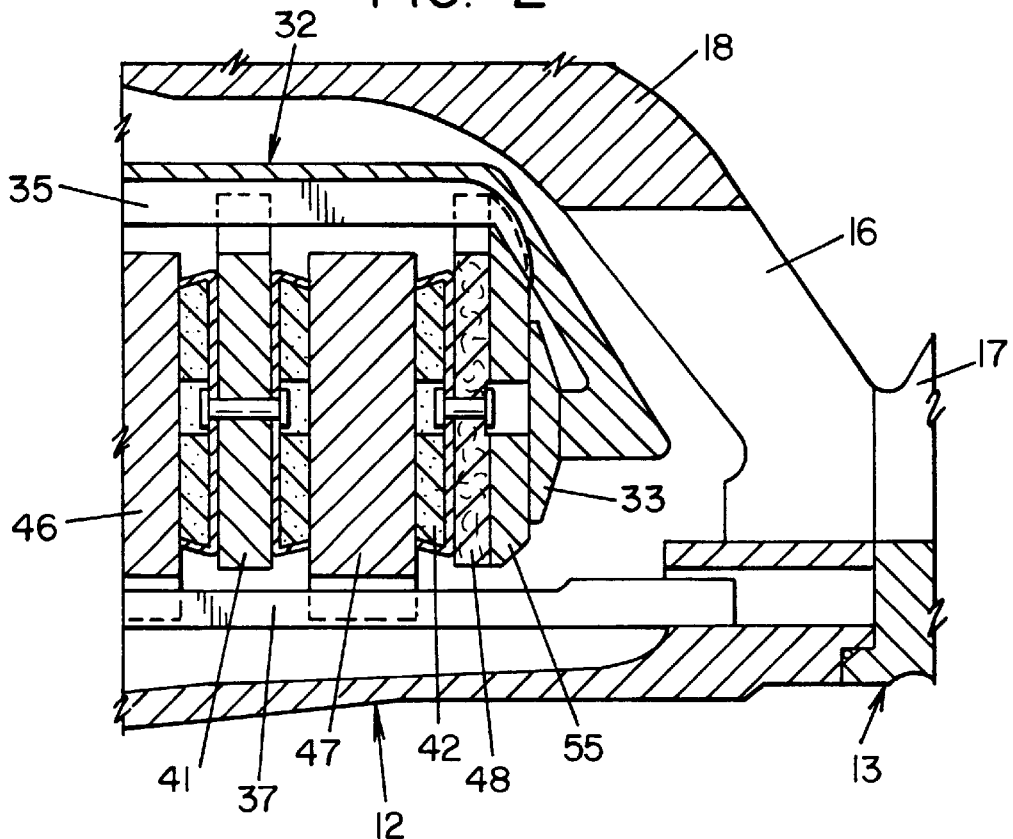
FIG. 2 is an enlarged cross-sectional view of a modified end portion of a torque tube.

Torque tube splines 35 support an axially moveable non-rotatable pressure plate 38 and a plurality of axially moveable non-rotatable annular stator disks such as stator disks 39, 40, and 41. All of such stator disks 39, 40 and 41 and pressure plate 38 have slotted openings at circumferentially spaced locations on their inner periphery for captive engagement by the splines 35 as is old and well known in the art. The respective annular stator disks 39, 40 and 41 each have friction brake linings or pads secured to opposite faces thereof in known manner as shown in FIG. 1. Pressure plate 38 is located at the front axial end of the brake stack and has a friction lining 38' on one surface thereof to act in concert with the other friction linings during a braking action. An annular end plate carrying friction braking material 42 is located at the rear axial end of the brake stack. The end plate is suitably connected to the reaction plate 33, for example by a plurality of torque pucks, or by direct attachment to the reaction plate, both in known manner, and acts in concert with the stator disks and the pressure plate 38 to be further described. As shown in FIG. 2, annular end plate 55 may extend radially inwardly and engage splines 35.

The friction device includes a plurality of axially spaced rotor disks such as rotor disks 44, 45, 46 and 47 interleaved between the pressure plate 38 and the stator disks 39 through 41 and the end plate. Each of these rotor disks has a plurality of circumferentially spaced slots around its outer periphery for engagement by the corresponding drive ribs 37 as is old and well known in the art thereby forming the rotor disks for the friction brake 10. The respective annular rotor disks 44, 45, 46 and 47 are generally rotatable steel rotors consisting of individual segments that are joined together, for example by links and rivets in known manner such as described in U.S. Pat. No. 4,747,473 (to Holzworth). Such stator disks with their friction linings and rotor disks acting together during a braking action provide a heat sink. The number and size of disks of the brake stack may be varied as is necessary for the application involved. Such friction linings or pads may be formed from copper based or iron based material.

The actuator for the brake includes the carrier or piston housing 25 which contains the circumferentially spaced cylinder housings 28, and as shown in FIG. 1, is integral with the flange 27 and hub 26 coupled to fixed mounting means including axle 23. As seen in FIG. 1, cylinder housing 28 has a bore 20 which receives a piston cylinder 29 which as shown in FIG. 1 is threaded on its outer surface as at 49 for convenience of assembling into the cylindrical housing 28 to create a pressure chamber 21 that is suitably connected via conduits to a pressure source. Only one piston cylinder 29 is shown, but flange 27 supports a plurality of cylinder housings 28 that are circumferentially spaced around axle means 23 in known manner. Each cylinder housing 28 has a piston slidably mounted therein for actuation by fluid pressure to move a piston head 53 against the pressure plate 38 to effect a braking action wherein the pressure plate 38 axially moves the stator disks 39, 40, and 41 along with the rotor disks 44, 45, 46 and 47 against one another and end plate 42 held by reaction plate 33.

In the normal non-actuated condition of the brake assembly, the piston head 53 is in a withdrawn condition as illustrated in FIG. 1 with an air gap existing between the pressure plate 38 and piston head 53. To effect an actuation of the brakes, the pilot of the aircraft actuates suitable controls which directs pressurized fluid via a suitable conduit to the pressure chamber in brake cylinder 29 which moves piston head 53 a distance equal to the air gap, and thence moves the piston head 53 towards the pressure plate 38 to engage and squeeze the rotor and stator disks between the pressure plate and the reaction plate 33 to effect the braking action.

The actuator contains suitable automatic brake adjusting means to insure that an air gap is maintained between the actuator and the brake reaction plate when an operator releases the actuation of the braking action. For example,an air gap is maintained between the pressure plate 38 and the piston head 53 upon release of fluid pressure in cylinder 29 when an operator releases the actuation of the braking action. This mechanism may be contained within piston cylinder 29. A suitable hydraulic actuation mechanism is fully illustrated and described in U.S. Pat. No. 5,205,382 which is incorporated herein by reference.

The pressure plate 38 located at the front axial end of the brake stack has an annular rigid disk or plate 38" attached as by riveter or other suitable mechanical fastener to the front face or surface of plate 38 opposite to the rear face that receives the friction brake lining 38'. Such rigid disk 38" is located between the steel pressure plate 38 and the piston head 53. Alternatively, the rigid disk 38" may be coupled to the torque tube via slots provided at circumferentially spaced locations on its inner periphery as the pressure plate 38 itself and allowed to float relative to the pressure plate 38. It is important to note that the rigid disk 38" is not a friction member and therefore can be tailored to be rigid (defined as having greater resistance to bending, flexing, deformation and flow than AMS 6302 steel) to enhance the uniformity of clamp load during high energy stops as the heat sink temperature increases as discussed above. In a preferred embodiment, the first rigid disk is formed of a material capable of maintaining a clamp load during braking application during a high energy stop that is more uniform than the clamp load that results when using a plate of steel having a resistance to bending comparable to that of said rigid disk at 75 degrees Fahrenheit. In a preferred embodiment, such rigid disk 38" is a high-strength, high-modulus, annular carbon composite member having a density much lower than steel that can remain more rigid than steel at extremely high temperatures such as 2000° F. or more. Applicant has found that carbon fiber reinforced carbon composite material available under the brand name SuperCarb™ from The B. F. Goodrich Company is eminently suitable for rigid disk 38". Applicant believes that other carbon composites that are currently commercially used for the manufacture of friction disks for aircraft brakes are suitable for rigid disk 38". Other materials that remain rigid at such high temperatures may be employed such as composites including ceramic fibers or ceramic matrix, including cermets, including those formed of aluminum and boron carbide.

According to a further modification of the invention (FIG. 2), at the rear axial end of the brake stack there is provided an end plate 55 including an annular rigid disk 48, similar to rigid disk 38", between the reaction plate 33 and the friction braking material 42. The end plate 55 is coupled against rotation relative to the reaction plate 33, the torque tube 32, or both. Second rigid disk 48 may be formed of any of the same materials that are suitable for rigid disk 38", and in a particularly preferred embodiment is formed of carbon composite. With the use of the annular rigid disk 38" at the front end of the brake stack or the use of both of annular rigid disks 38" and 48 at the front and rear axial ends of the brake stack, the torque output of a given friction material and heat sink will improve at elevated operating temperature compared to a conventional brake utilizing steel members for the pressure plate and the end plate. The composite first and second rigid disks when coupled to the torque tube against rotation may be provided with metal reinforcing inserts to provide reinforcement to the walls of such slotted openings and to enhance the life of such slots.

Carrier 25 has a bore therethrough that slidingly receives an axially extending wear pin 50 that has one end suitably secured to the front axial end of the brake stack at one of rigid disk 38" and pressure plate 38. The other end of wear pin 50 extends beyond the carrier 25 to be visibly seen to indicate the amount of wear occurring within the brake stack. The length of the wear pin can be fixed to indicate to an observer when the friction brake linings need replacement for safety reasons. With the use of the rigid disk 38" with the pressure plate 38 and the rigid disk 48 with the reaction plate 33, the brake stack is retained in a compact planar condition permitting the readout on the wear pin as a true indication of brake wear. With the use of a rigid disk with the pressure plate alone or both the pressure plate and the end plate, there is a more uniform distribution of the clamp load across the faces of the brake linings in the brake stack (stators, rotors, pressure plate and end plate). In addition, it is possible to thus maintain a more uniform clamp load during any high energy braking application (including a rejected take-off) as the heat sink temperature increases thereby causing the steel component strength and stiffness properties to decay, which condition would ordinarily prevent the clamp load from being effectively applied across the full face width of the brake linings thereby contributing to degradation of the torque output. With the use of the rigid pressure disk alone or together with a rigid reaction disk of carbon or other composite material as described, there is an improvement in the torque output of a given metallic friction material and heat sink configuration. Such improved torque output can also provide a reduction in the number of pistons needed to apply the braking action which further reduces the weight of the brake system when considering that there are a plurality of landing wheel assemblies for a single aircraft.

According to the invention there is provided a method of assembling a brake stack including having a front axial end adapted to be positioned adjacent to an actuator and a rear axial end adapted to be positioned adjacent to a reaction member, the brake stack including alternating rotor and stator disks mountable with respect to an inner torque tube and an outer wheel for relative rotatable and axial movement, each rotor disk adapted to be coupled to said wheel for rotation therewith and each stator disk adapted to be coupled to said torque tube against rotation relative to said torque tube; the majority of the disks of the brake stack being formed of a material that will deform or flow during an anticipated high energy braking action; the method comprising providing the front axial end of the brake stack with a first rigid disk; the first rigid disk capable of evenly distributing the clamping load across the faces of said brake stack when said actuator is operated to effect said braking action.

As an example, an aircraft brake according to the invention was made having the following brake stack: a carbon composite rigid stator disk 0.3 inches thick, a steel (AMS 6302) pressure plate stator of 0.27 inches thick, four steel stators, a steel end plate, each stator equipped with friction pads, the foregoing stators interleaved with five steel rotors, the brake stack having an outside diameter of about 18 inches and an inside diameter of about 10 inches. When tested under its respective simulated rejected take-off conditions which caused the friction linings to fuse, the brake stack remained flat throughout the test and consumed about 0.4 inch of piston travel. In contrast, in a different brake having as its sole pressure plate one of AMS 6302 steel 0.3 inches thick and four steel rotors and three steel stators, about 0.8 inch of piston travel was consumed when tested under its respective simulated rejected take-off conditions which caused the friction linings to fuse and the steel pressure plate to deform.

It is apparent that, although a specific embodiment and a modification of the invention has been described in detail, the invention is not limited to such specifically illustrated and described construction since variations may be made without departing from the principles of the invention. For example, the friction linings could be mounted to the rotors and the stators could be formed of steel plates. The thickness of the steel pressure plate may be further reduced because its function in the invention is primarily as a carrier for mechanical attachment of the friction lining or pads. Where the properties of the rigid disk permit, the friction lining or pads may be attached to the rigid disk, and the steel pressure plate reduced to a thin skin or entirely eliminated. Although the invention has been described by reference to specific aircraft brake embodiments, it can be used in any multi-disc clutch or brake application.

I claim:

1. A friction device comprising: a brake stack having a front axial end adapted to be positioned adjacent to and for contacting engagement with a plurality of circumferentially spaced pressure application members and a rear axial end adapted to be positioned adjacent to a reaction member, the brake stack including alternating rotor and stator disks mountable with respect to an inner torque tube and an outer wheel for relative rotatable and axial movement, each rotor disk adapted to be coupled to said wheel for rotation therewith and each stator disk adapted to be coupled to said torque tube against rotation relative to said torque tube; the majority of the disks of the brake stack being formed of a material that will deform or flow during an anticipated high energy braking action; the front axial end of the brake stack comprising a first rigid disk capable of evenly distributing the clamping load across the faces of said brake stack when said pressure application members are operated to effect said braking action, and capable of maintaining a clamp load across the brake stack during braking application during a high energy stop that is more uniform than the clamp load across the brake stack that results when using only a pressure plate of steel.

2. The friction device of claim 1, the front axial end of the brake stack comprising in sequence said first rigid disk and a steel pressure plate.

3. The friction device of claim 2 wherein friction braking material is secured to one annular face on said pressure plate that is furthermost from said front axial end; and said first rigid disk is formed of a material capable of maintaining a clamp load across the brake stack during braking application during a high energy stop that is more uniform than the clamp load across the brake stack that results when using a plate of steel having a resistance to bending comparable to that of said rigid disk at 75 degrees Fahrenheit.

4. The friction device of claim 1 wherein the first rigid disk is formed of carbon or ceramic composite material.

5. The friction device of claim 1 wherein the first rigid disk is formed of carbon fiber reinforced composite material.

6. The friction device of claim 1 wherein the first rigid disk is formed of cermet material.

7. The friction device of claim 1 wherein the first rigid disk is formed of aluminum and boron carbide cermet material.

8. The friction device of claim 1 further comprising a second rigid disk at the rear axial end of the brake stack.

9. The friction device of claim 8 wherein the first rigid disk is formed of carbon or ceramic composite material.

10. A friction device comprising: a plurality of actuators spaced circumferentially about and operatively connected against rotation during a braking action to a fixed mounting means including an axle; a wheel member operatively connected to said axle and rotatable with respect thereto; said wheel member having a plurality of axially extending drive ribs; a torque tube member operatively connected to said actuators; said torque tube member having a radially outwardly extending annular end portion defining a torque plate reaction member; said torque tube having a plurality of axially extending splines; a brake stack having a front axial end positioned adjacent to and contacted only at circumferentially spaced apart locations by said plurality of actuators during a braking action and a rear axial end positioned adjacent to a reaction member, the brake stack including alternating rotor and stator disks mounted with respect to an inner torque tube and an outer wheel for relative rotatable and axial movement, each rotor disk coupled to said wheel for rotation therewith and each stator disk coupled to said torque tube against rotation relative to said torque tube; the majority of the disks of the brake stack being formed of a material that will deform or flow during an anticipated high energy braking action; the brake stack comprising in sequence from its front axial end a first rigid disk and a steel pressure plate; the first rigid disk arranged to coact with said pressure plate to evenly distribute the clamping load across the faces of said brake stack when said actuators are operated to effect said braking action; wherein friction braking material is secured to one annular face on said steel pressure plate that is furthermost from said front axial end; and said first rigid disk is formed of a material capable of maintaining a clamp load across the brake stack during braking application during a high energy stop that is more uniform than the clamp load across the brake stack that results when using only a pressure plate of steel.

11. The friction device of claim 10 wherein the majority of said disks of said brake stack are formed of ferrous material.

12. The friction device of claim 11 wherein the first rigid disk is formed of carbon or ceramic composite material.

13. The friction device of claim 10 wherein the first rigid disk is formed of carbon fiber reinforced composite material.

14. The friction device of claim 10 wherein the first rigid disk is formed of cermet material.

15. The friction device of claim 10 wherein the first rigid disk is formed of aluminum and boron carbide cermet material.

16. The friction device of claim 10 further comprising a second rigid disk at the rear axial end of the brake stack that is formed of carbon or ceramic composite material.

17. The friction device of claim 10 wherein metallic friction material is secured to one annular face on said pressure plate that is furthermost from said front axial end; and said first rigid disk is formed of a material capable of maintaining a clamp load across the brake stack during braking application during a high energy stop that is more uniform than the clamp load across the brake stack that results when using only a pressure plate of steel, and capable of maintaining a clamp load across the brake stack during braking application during a high energy stop that is more uniform than the clamp load across the brake stack that results when using a plate of steel having a resistance to bending comparable to that of said rigid disk at 75 degrees Fahrenheit.

18. A friction device as set forth in claim 10 wherein the front axial end of the brake stack has an axially extending rod secured thereto having a portion of said rod extending outwardly through said fixed mounting means to indicate the wear of said brake stack.

19. The friction device of claim 10 wherein each stator disk has a friction pad formed from one of copper based and ferrous based material on each side thereof that is presented for frictional engagement by an associated rotor disk.

20. The friction device of claim 10 wherein each rotor disk has a friction pad formed from one of copper based and ferrous based material on each side thereof that is presented for frictional engagement by an associated stator disk.

21. The friction device of claim 10 wherein the stator disk at the the rear axial end of the brake stack is mounted on said torque plate and secured thereto.

22. The friction device of claim 10 wherein the plurality of actuators comprises a plurality of circumferentially spaced hydraulically actuated pistons connected through said torque tube to said torque plate reaction member for squeezing the rotor disks and stator disks of the brake stack together to apply braking force to the wheel, each of the pistons having a piston head arranged for contact with the first rigid disk.

23. The friction device of claim 10 wherein the first rigid disk is coupled to the torque tube but not to the steel pressure plate.

24. The friction device of claim 10 wherein the first rigid disk is coupled to the steel pressure plate.

25. A method of assembling a brake stack having a front axial end adapted to be positioned adjacent to and contacted only at circumferentially spaced apart locations by a plurality of circumferentially spaced apart pressure application members and a rear axial end adapted to be positioned adjacent to a reaction member, the brake stack including alternating rotor and stator disks mountable with respect to an inner torque tube and an outer wheel for relative rotatable and axial movement, each rotor disk adapted to be coupled to said wheel for rotation therewith and each stator disk adapted to be coupled to said torque tube against rotation relative to said torque tube; the majority of the disks of the brake stack being formed of a material that will deform or flow during an anticipated high energy braking action; the method comprising providing the front axial end of the brake stack with a first rigid disk arranged to be contacted only at circumferentially spaced apart locations by said plurality of circumferentially spaced apart pressure application members; the first rigid disk capable of evenly distributing the clamping load across the faces of said brake stack when said pressure application members are operated to effect said braking action, the first rigid disk being formed of a material capable of maintaining a clamp load across the brake stack during braking application during a high energy stop that is more uniform than the clamp load across the brake stack that results when using only a pressure plate of steel.

* * * * *